(12) United States Patent
Nomura (10) Patent No.: US 9,406,337 B2
(45) Date of Patent: Aug. 2, 2016

(54) DISK ARRAY DEVICE, A FAILURE PATH SPECIFYING METHOD AND A PROGRAM THEREOF

(71) Applicant: Shoichi Nomura, Tokyo (JP)

(72) Inventor: Shoichi Nomura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 185 days.

(21) Appl. No.: 13/852,051

(22) Filed: Mar. 28, 2013

(65) Prior Publication Data
US 2013/0258831 A1    Oct. 3, 2013

(30) Foreign Application Priority Data

Mar. 30, 2012   (JP) .................................. 2012-080514

(51) Int. Cl.
*G06F 11/00* (2006.01)
*G11B 20/18* (2006.01)
*G06F 11/22* (2006.01)

(52) U.S. Cl.
CPC ........ *G11B 20/1816* (2013.01); *G06F 11/2221* (2013.01)

(58) Field of Classification Search
CPC ..................... G06F 11/0727; G06F 11/0751
USPC ........................................................ 714/43, 42
See application file for complete search history.

(56) References Cited

U.S. PATENT DOCUMENTS

| 7,155,636 | B2 * | 12/2006 | Nagata ........................... 714/4.3 |
| 7,406,617 | B1 * | 7/2008 | Athreya et al. .............. 714/4.11 |
| 8,204,980 | B1 * | 6/2012 | Sandstrom et al. ............ 709/224 |
| 2002/0104039 | A1 * | 8/2002 | DeRolf et al. .................. 714/30 |
| 2006/0048018 | A1 * | 3/2006 | Hosoya et al. .................. 714/48 |
| 2007/0055797 | A1 * | 3/2007 | Shimozono ..................... 710/36 |
| 2007/0168705 | A1 * | 7/2007 | Dohi ................................. 714/6 |
| 2007/0180293 | A1 * | 8/2007 | Takahashi ........................ 714/6 |
| 2009/0132866 | A1 * | 5/2009 | Makino ........................... 714/48 |
| 2012/0233494 | A1 * | 9/2012 | Sandstrom et al. ............ 714/4.1 |

FOREIGN PATENT DOCUMENTS

JP        2010-244130 A    10/2010

* cited by examiner

*Primary Examiner* — Chae Ko (57) ABSTRACT

The object of the present invention is to provide a disk array device, a failure path specifying method and a program thereof capable of specifying a physical interconnection path where failures occurred.

20 Claims, 9 Drawing Sheets

DISK ARRAY DEVICE, A FAILURE PATH SPECIFYING METHOD AND A PROGRAM THEREOF

This application is based upon and claims the benefit of priority from Japanese patent application No. 2012-080514, filed on Mar. 30, 2012, the disclosure of which is incorporated herein in its entirety by reference.

BACKGROUND

The embodiments of the present invention relate to a disk array device, a failure path specifying method and a program thereof. More particularly, it relates to a disk array device for specifying a failure path.

Recently, a disk array device which is used as one disk device by integrating a plurality of disk devices logically is spread. Because the disk array device distributes and writes data in a plurality of disk devices, it is possible to realize a speedup of reading and writing of data, an increase of the storage capacity or a high reliability.

Although the disk array device having a plurality of disk devices has a merit described above, there is a problem that a failure rate is high. As a result, various technologies that a disk device in which a failure occurred is replaced with other disk device are proposed (Patent Document 1).

[Patent Document 1] JP-A-2010-244130

In Patent Document 1, it is possible to specify the disk device in which a failure occurred. However, there is a problem that it is not possible to specify the physical interconnection path where the failure occurred.

SUMMARY OF THE INVENTION

An exemplary object of the embodiments of the present invention is to provide a disk array device, a failure path specifying method and a program thereof which are capable of specifying a physical interconnection path where failures occurred.

According to a non-limiting illustrative embodiment, a disk array device comprising: a plurality of first disk devices; a control unit configured to control the first disk devices; and a first switch unit configured to intervene between the control unit and each of the first disk devices via paths, wherein the control unit performs a writing test for determining whether or not it is possible to write test data in each of the first disc devices and identifies a failure path in the paths according to a result of the writing test.

According to a non-limiting illustrative embodiment, a failure path specifying method of a disc array device having a plurality of first disk devices, a control unit and a first switch unit configured to intervene between the control unit and each of the first disk devices via paths, comprising: controlling the first disk devices; performing a writing test for determining whether or not it is possible to write test data in each of the first disc devices; and identifying a failure path in the paths according to a result of the writing test in an identifying step.

According to a non-limiting illustrative embodiment, a computer readable medium recording thereon a program for enabling a computer to carry out a failure path specifying method of a disc array device having a plurality of first disk devices, a control unit and a first switch unit configured to intervene between the control unit and each of the first disk devices via paths, the method comprising: controlling the first disk devices; performing a writing test for determining whether or not it is possible to write the test data in each of the first disc devices; and identifying a failure path in the paths according to a result of the writing test in an identifying step.

According to a non-limiting illustrative embodiment, a disk array device comprising: a plurality of first disk devices configured to store test data; a control unit configured to control the first disk devices; and a first switch unit configured to intervene between the control unit and each of the first disk devices via paths, and wherein the control unit performs a reading test for determining whether or not it is possible to read the test data in each of the first disc devices and identifies a failure path in the paths according to a result of the reading test.

BRIEF DESCRIPTION OF THE DRAWINGS

Other features and advantages of various embodiments of the present invention will become apparent by the following detailed description and the accompanying drawings, wherein.

DETAILED DESCRIPTION

A first exemplary embodiment of the present invention will be described in detail below.

(1) First Exemplary Embodiment

A disk array device, a failure path specifying method and a program thereof in a first exemplary embodiment will be described with reference to drawings.

[Disk Array Device]

Figure 1:
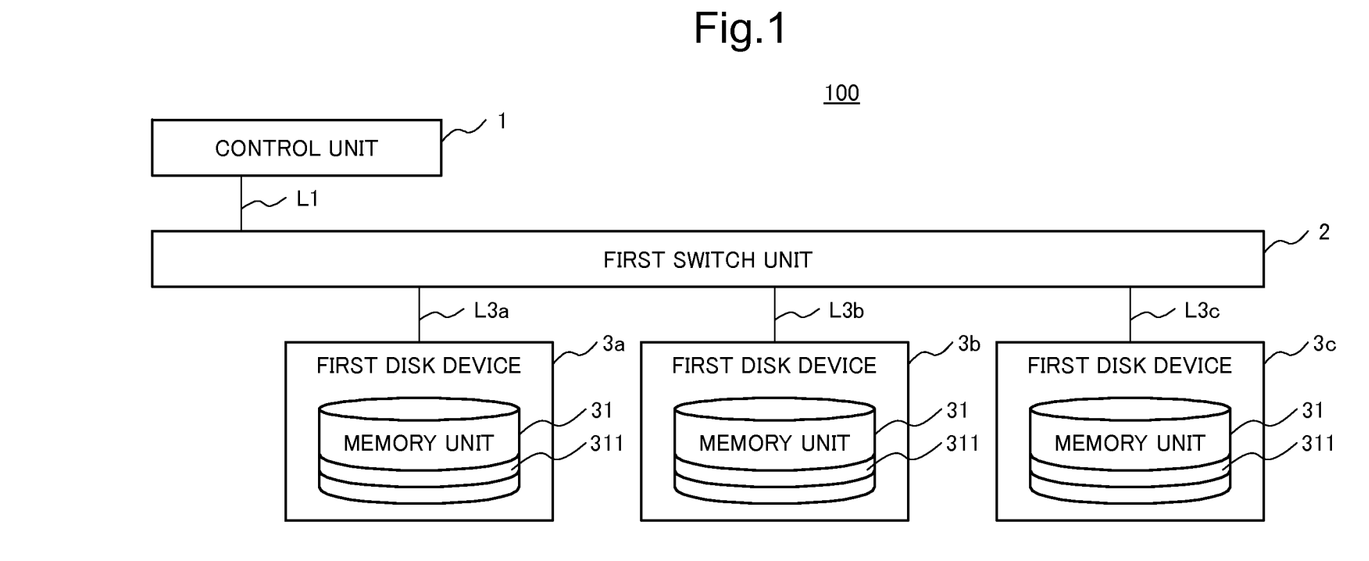
FIG. 1 is a diagram showing a configuration of a disk array device according to a first exemplary embodiment of the present invention.

FIG. 1 is a diagram showing a configuration of a disk array device according to a first exemplary embodiment.

As shown in FIG. 1, a disk array device 100 includes a control unit 1, a first switch unit 2 and a plurality of first disk devices 3a-3c. The control unit 1 is connected to the first switch unit 2 via physical interconnection path L1 as a path. The plurality of first disk devices 3a-3c are connected to the first switch 2 via physical interconnection paths L3a-c, respectively.

Each of first disk devices 3a-3c has a data stored unit 31 for storing data. The data stored unit 31 has a test area 311 for storing a test pattern as test data for fault detection.

The control unit 1 controls data access from an external devices to the data stored unit 31 of each first disk devices 3a-3c. The first switch unit 2 intervenes between the control unit 1 and each first disk devices 3a-3c, and assigns data from the control unit 1 to each first disk devices 3a-3c.

The control unit 1 carries out writing processing of a test pattern in the test area 311 of the data stored unit 31 in each first disk devices 3a-3c. When receiving a failure report as an error from the first disk device 3a, the control unit 1 determines whether or not the failure report was received from the first disk devices 3b and 3c which are other than the first desk device 3a. And when receiving the failure report from the first disk devices 3b and 3c, the control unit 1 specifies a physical interconnection path L1 which connects the control unit 1 and the first switch unit 2 as a failure path. On the other hand, when the failure report is not received from the first disk devices 3b and 3c, the control unit 1 specifies a physical interconnection path L3a which connects the first switch unit 2 and the first disk device 3a as a failure path.

In the disk array device mentioned above, the test pattern is written in the test area 311 of each first disk devices 3a-3c. And a physical interconnection path where failures occurred can be specified based on a result of writing the test pattern to each first disk devices 3a-3c.

Figure 2:
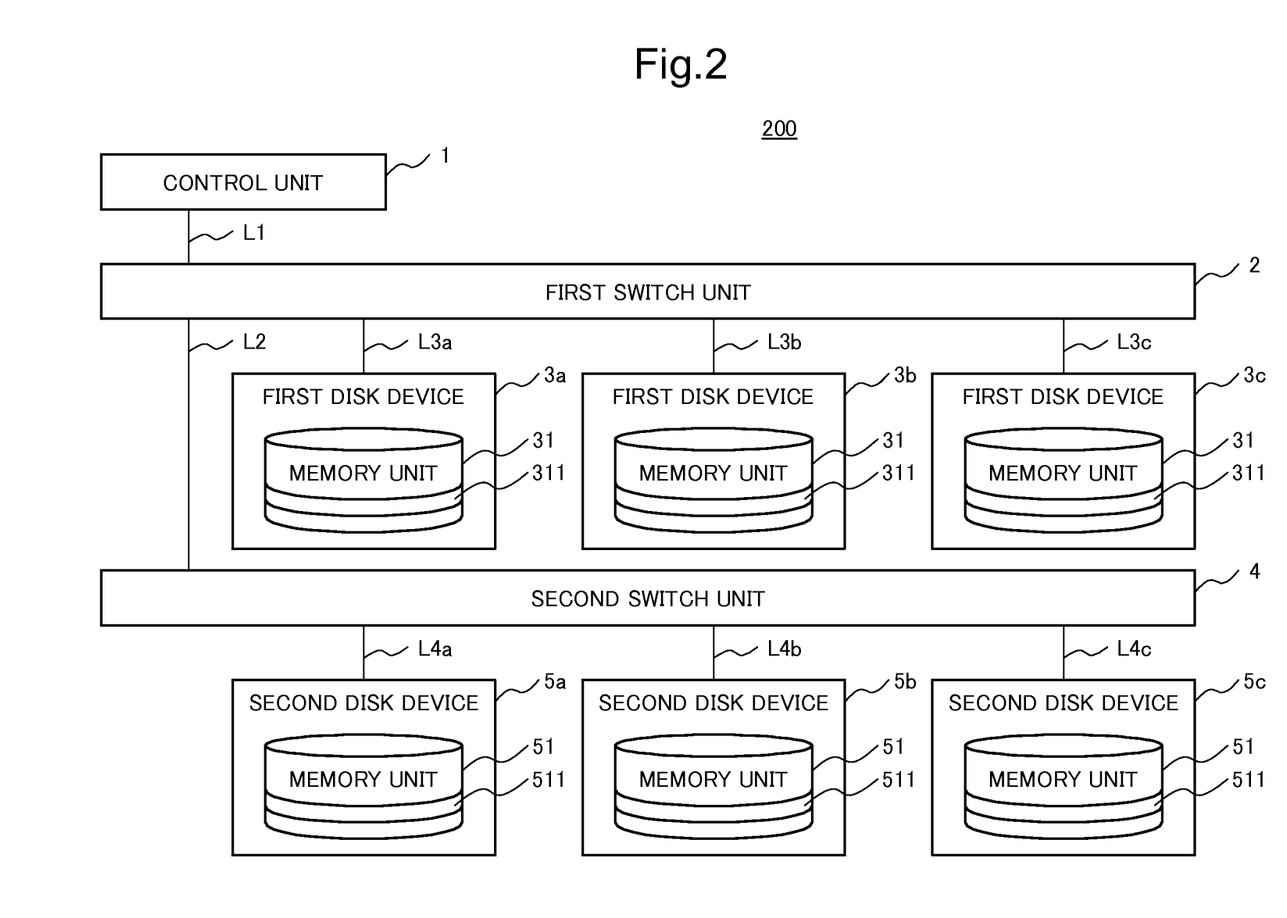
FIG. 2 is a diagram showing a variation of the configuration of the disk array device in the first exemplary embodiment.

FIG. 2 is a diagram showing a variation of the configuration of the disk array device in the first exemplary embodiment. As shown in FIG. 2, the disk array device 200 includes a second switch unit 4 and a plurality of second disk device 5a-5c in addition to the control unit 1, the first switch unit 2 and the plurality of first disk devices 3a-3c. The disk array device 200 further includes the physical interconnection path L1, a physical interconnection path L2, the physical interconnection paths L3a-L3c and physical interconnection paths L4a-L4c. The physical interconnection path L1 connects to the control unit 1 and the first switch unit 2. The physical interconnection path L2 connects to the first switch unit 2 and the second switch unit 4. Physical interconnection paths L3a-L3c connect to the first switch unit 2 and each first disk devices 3a-3c, respectively. Physical interconnection paths L4a-L4c connect to the second switch unit 4 and each second disk devices 5a-5c, respectively.

The control unit 1 has a function to write data sent from an external device such as a terminal device or a server in the data stored unit 31 of each first and second disk devices 3a-3c and 5a-5c. And the control unit 1 has a function to read data from the data stored unit 31 of each first and second disk devices 3a-3c and 5a-5c according to the request from an external device. A processor of a control unit in a RAID (Redundant Arrays of Inexpensive Disks) is an example of the control unit 1.

The first switch unit 2 and the second switch unit 4 have a function to allocate writing instructions and reading instructions from the control unit 1 to each disk devices 3a-5c in this exemplary embodiment. A SAS (Serial Attached SCSI) expander is an example of the first switch unit 2 and the second switch unit 4.

The first disk devices 3a-3c and the second disk devices 5a-5c have the data stored units 31 for storing data written by the control unit 1. Each of data stored unit 31 has the test area 311 for storing a test pattern. A hard disk drive with an interface of a SAS (Serial Attached SCSI) is an example of the first disk devices 3a-3c and the second disc drives 5a-5c.

Figure 3:
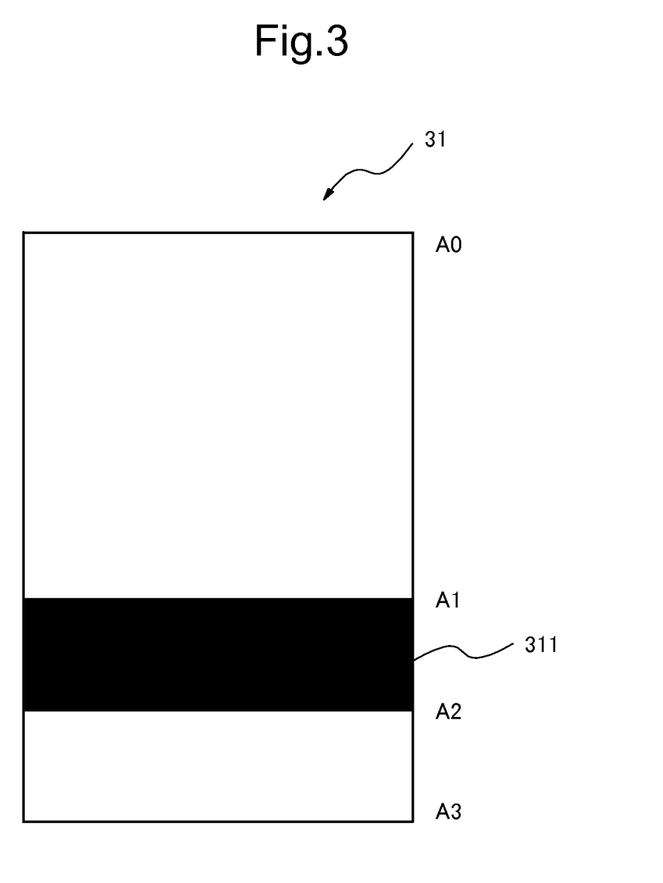
FIG. 3 is a diagram showing a logical address map of a data stored unit of a disk device.

FIG. 3 is a diagram showing a logical address map in a data stored unit of each disk device according to the first exemplary embodiment.

As shown in FIG. 3, a logical address A0 is a head of the logical address in a logic region of the data stored unit 31. A logical address A1 is a logical address showing a head of the test area 311 of the data stored unit 31. A logical address A2 is a logical address showing a head of the test area 311 of the data stored unit 31. A logical address A3 is an end of the logical address in the data stored unit 31. Further, a storage area surrounded by the logical addresses A1 and A2 is the test area 311.

Each of the physical interconnection paths L1, L2, L3a-L3c and L4a-L4c has a function to exchange data between each of the above-mentioned device by a serial transmission. The serial transmission is a control system which performs a transmission and reception of data by a separate signal line. The typical transmission specifications are SAS and a Fiber Channel.

Figure 4:
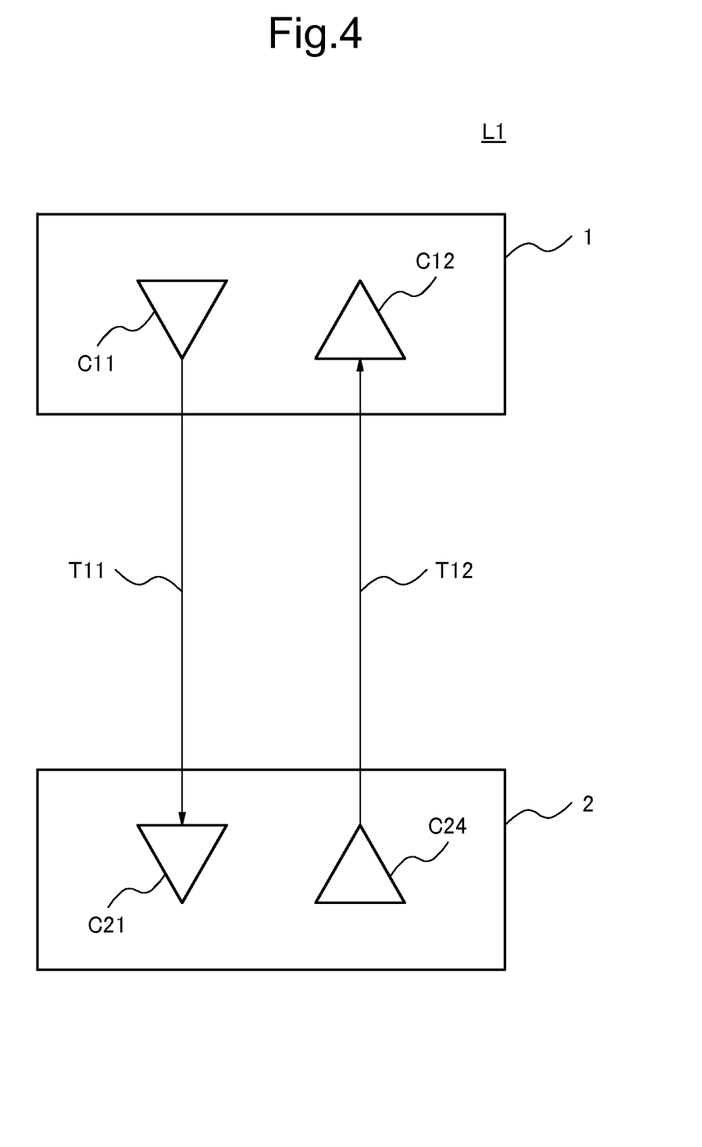
FIG. 4 is a diagram showing details of a physical interconnection path of a disk array device.

Next, a physical interconnection path will be described in detail with reference to FIG. 4. FIG. 4 is a diagram showing a detail of the physical interconnection path. The physical interconnection path L1 between the control unit 1 and the first switch unit 2 is described below as a representative. The description of other physical interconnection paths will be omitted because their configurations are similar to that thereof.

The physical interconnection path L1 has a signal line T11 which transmits write data and a signal line T12 which transmits read data. The physical interconnection path L1 has a signal transmission circuit C11 for sending a signal and a signal receiving circuit C12 for receiving a signal in the control unit 1. The physical interconnection path L1 also has similar signal transmission circuit C24 and signal receiving circuit C21 in the switch unit 2.

[Operation of Disk Array Device]

An operation of the disk array device in the first exemplary embodiment of the present invention will be described with reference to drawings. Further, according to the first exemplary embodiment, because a failure path specifying method is put into effect by operating the disk array device, a description of the failure path specifying method in the first exemplary embodiment is substituted for an operation description of the following disk array device.

In the following description, the operation when the control unit 1 writes a test pattern in the test area 311 of the data stored unit 31 in the first disk device 3a is described as a representative. Further, because the operation when the control unit 1 writes the test pattern in the first disk devices 3b and 3c is also the same as the first disk device 3a, the description is omitted.

Figure 5:
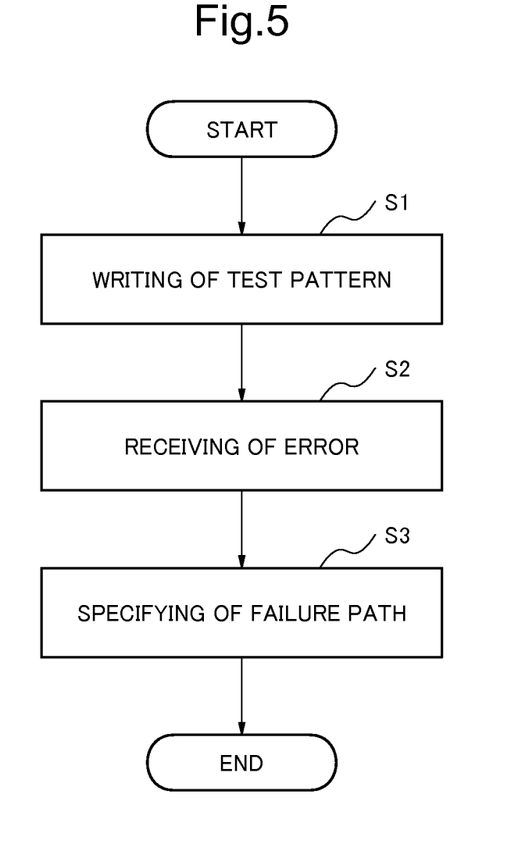
FIG. 5 is a flow chart showing an operation procedure of reading test pattern in a disk array device.

FIG. 5 is a flow chart showing an operation procedure in the time of test pattern writing of the disk array device according to the first exemplary embodiment.

Figure 6:
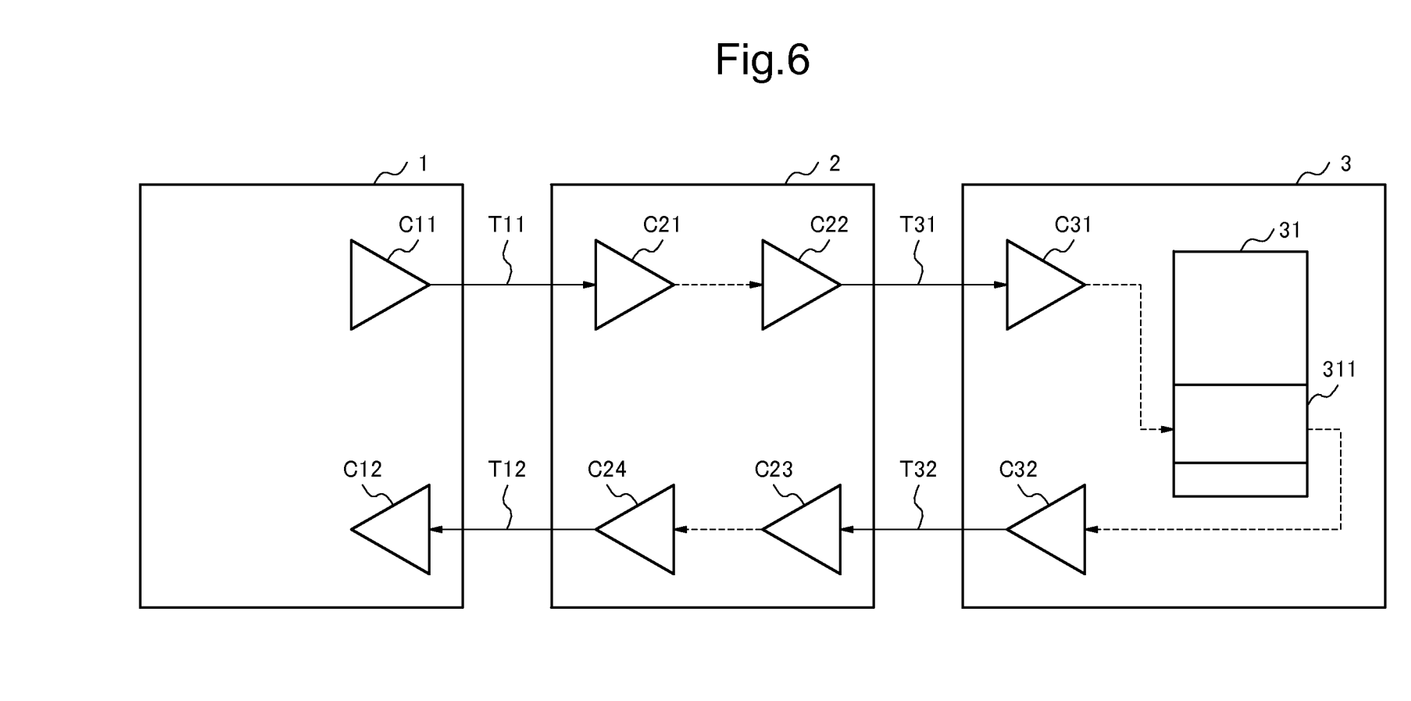
FIG. 6 is a diagram showing a flow of data in reading and writing process in a disk array device.

As shown in FIG. 5, the control unit 1 writes the test pattern in the test area 311 of the data stored unit 31 in the first disk device 3a via the first switch unit 2 (Step S1). This Step S1 will be described in detail with reference to FIG. 6. FIG. 6 is a diagram showing a flow of data in the time of writing and reading of the disk array device according to the first exemplary embodiment. As shown in FIG. 6, the control unit 1 transmits the test pattern to the signal receiving circuit C21 of the first switch unit 2 from the signal transmission circuit C11.

Further, it is better that a signal of the test pattern is against the signal receiving circuit C21 of the first switch unit 2 and the signal receiving circuit C31 of the first disk device 3a. For example, in case of a transmission in a SAS, a test pattern indicated on Chapter 6.7.7.1.1 Test bit patterns and sequence characteristics of "Serial ATA: High Speed Serialized AT Attachment Revision 1.0a" can be used. Additionally, a test pattern such as a CRPAT (Continuous Random Pattern) and a CJTPAT (Continuous Jitter Pattern) may also be used.

Figure 7:
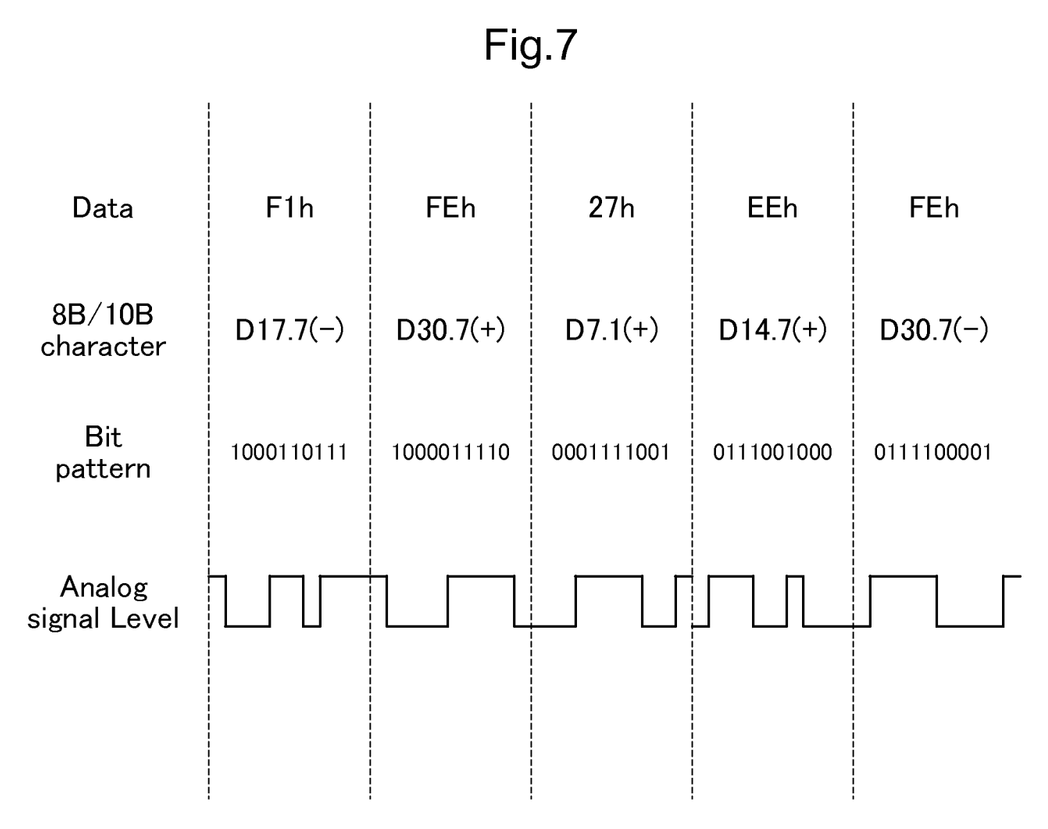
FIG. 7 is a diagram showing an example of a test pattern used in a disk array device.

FIG. 7 shows a relation between data when using a test pattern indicated on "Serial ATA: High Speed Serialized AT Attachment Revision 1.0a Chapter 6.7. 7.1.1 Test bit patterns and sequence characteristics", and an actual signal. A part of the data written in the test area 311 as a test pattern is described as Data. Data in F1h, FEh, 27h, EEh and FEh is described as its part in FIG. 7. Based on the specification of "Serial ATA: High speed serialized AT Attachment Revision 1.0a", the control unit 1 performs 8B/10B conversion to the Data and converts into a character string represented in a Bit Pattern. The control unit 1 transmits this Bit Pattern from the signal transmission circuit C11 as an actual electric signal (Analog Signal Level).

Next, as shown in FIG. 6, in the first switch unit 2, the signal receiving circuit C21 receives the test pattern from the control unit 1, and the received test pattern is transmitted to the first disk device 3a via the signal line T31 from the signal transmission circuit C22.

In the first disk device 3a, the signal receiving circuit C31 receives the test pattern from the first switch unit 2, and this test pattern is written in the test area 311 of the data stored unit 31. Here, when each physical interconnection paths L1 and L3a is normal, the test pattern is received with no problem by the signal receiving circuit C21 of the first switch unit 2 and the signal receiving circuit C31 of the first disk device 3a. And in the first disk device 3a, the Analog signal Level signal of FIG. 7 is received and converted to the Data of FIG. 7, and this Data is written in the test area 311 of the data stored unit 31. On the other hand, when there is a problem before the test pattern reaches the first disk device 3a, and a warp appears in the Analog Signal Level in FIG. 7, it is detected that the conversion by the 8B/10B conversion cannot be performed rightly, and a failure is detected in the first disk device 3a. At that time, it is returned to the control unit 1 from the first disk device 3a as a failure report that the test pattern could not be received (Step S2).

The control unit 1 also carries out writing processing mentioned above to the first other disk devices 3b and 3c and specifies a failure path which is a physical interconnection path where the failure occurred (Step S3).

The method that the control unit 1 specifies the failure path will be described concretely. When receiving the failure report that the writing of the test pattern is failed from the first disk devices 3b and 3c, the control unit 1 specifies the physical interconnection path L1 which is common among each first disk devices 3a-3c as the failure path. That is, the control unit 1 specifies the physical interconnection path L1 which connects the control unit 1 and the first switch unit 2 as the failure path. More specifically, the control unit 1 specifies the physical interconnection path between the signal transmission circuit C11 and the signal receiving circuit C21 of the first switch unit 2 as the failure path.

When the control unit 1 does not receive the failure report from at least one of the first other disk devices 3b and 3c, the physical interconnection path L1 which is common among each first disk devices 3a-3c is excluded from the failure path. That is, a control unit 1 specifies a physical interconnection path L3a which connects to the first switch unit 2 and the first disk device 3a as the failure path.

More specifically, the control unit 1 specifies the physical interconnection path between the signal transmission circuit C22 of the first switch unit 2 and the signal receiving circuit C31 of the first disk device 3a as the failure path.

Figure 8:
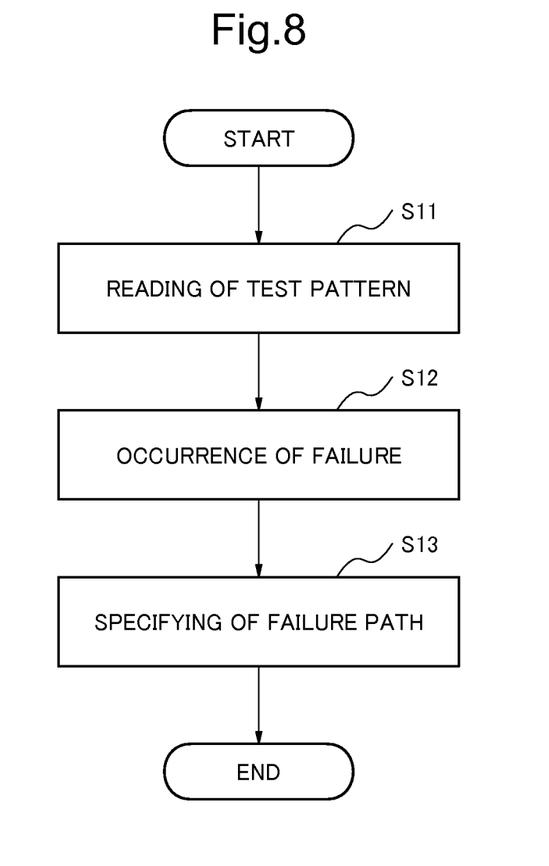
FIG. 8 is a flow chart showing an operation procedure of test pattern reading in a disk array device.

Next, an operation of the disk array device in the time of reading a test pattern will be described in FIG. 8. FIG. 8 is a flow chart showing an operation procedure of the disk array device in the time of reading a test pattern according to the first exemplary embodiment.

As shown in FIG. 8, the control unit 1 reads data of the test pattern stored in the test area 311 of the data stored unit 31 in the first disk device 3a (Step S11). Further, the test pattern is normally written in the test area 311 of the data stored unit 3 in the first disk device 3a.

This Step S11 will be described in detail with reference to FIG. 6.

As shown in FIG. 6, the signal transmission circuit C32 of the first disk device 3a transmits the test pattern stored in the test area 311 to the first switch unit 2 via the signal line T32.

Next, the first switch unit 2 receives the test pattern from the first disk device 3a in the signal receiving circuit C23 and transmits this received test pattern to the control unit 1 via the signal line T12 from the signal transmission circuit C24.

The control unit 1 receives the test pattern from the first switch unit 2 in the signal receiving circuit C12, and determines whether or not a failure occurred when this test pattern could not be read rightly (Step S12).

And the control unit 1 also carries out the reading processing mentioned above to the first other disk devices 3b and 3c, and specifies the failure path which is a physical interconnection path where the failure occurred (Step S13).

A specifying method of the failure path by the control unit 1 will be described in detail. When the received data cannot also be read right from the first other disk devices 3b and 3c, the control unit 1 specifies the physical interconnection path L1 which is common among each first disk devices 3a-3c as the failure path. That is, the physical interconnection path L1 which connects to the control unit 1 and the first switch unit 2 is specified as the failure path. More specifically, the control unit 1 specifies the physical interconnection path between the signal receiving circuit C12 of the control unit 1 and the signal transmission circuit C24 of the first switch unit 2 as the failure path.

When the control unit 1 could read the received data rightly from at least one of the first other disk devices 3b and 3c, the physical interconnection path L1 which is common among each first disk devices 3a-3c is excluded from the failure path. That is, the control unit 1 specifies the physical interconnection path L3a which connects to the first switch unit 2 and the first disk device 3a as the failure path. More specifically, the control unit 1 specifies the physical interconnection path between the signal receiving circuit C23 of the first switch unit 2 and the signal transmission circuit C32 of the first disk device 3a as the failure path.

In the above mentioned description, although the failure path specifying method about a case when failures occurred in the first disk device 3a is described, even when a failure occurs in the first other disk devices 3b and 3c, a failure path can be specified by the similar method.

When the control unit 1 performed writing processing in the second disk device 5a and a failure occurred, the control unit 1 determines whether or not a failure report has been received from each first disk devices 3a-3c. And when the failure report has been received from each first disk devices 3a-3c, the control unit 1 specifies the physical interconnection path L1 which is common among the first disk devices 3a-3c and the second disk device 5a as the failure path.

When not receiving a failure report from at least one of each first disk devices 3a-3c, the control unit 1 determines whether or not a failure report has been received from the second other disk devices 5b and 5c. When receiving the failure report from the second other disk devices 5b and 5c, the physical interconnection path L2 which is common among the second disk devices 5a-5c is specified as the failure path. On the other hand, when not receiving the failure report from at least one of the second other disk devices 5b and 5c, the physical interconnection path L4a is specified as the failure path. Further, when the control unit 1 read the test pattern from the second disk device 5a and the failure occurred, the control unit 1 can also specify the failure path by the same method as the above-mentioned description.

Further, in the first exemplary embodiment and the variation, it is possible to detect a failure of writing or reading inside the first and second disc devices 3a-3c, 5a-5c because the failure report includes information indicating the failure occurred inside the first and second disc devices 3a-3c, 5a-5c. As a result, it is possible to determine which the failure occurred in the physical interconnection path L1l, L2, L3a-3c, L4a-4c or the first and second disc devices 3a-3c, 5a-5c. That is to say, when the control unit 1 receives the failure report which includes the error indicating the failure occurred inside the first and second disc devices 3a-3c, 5a-5c, the control unit can recognize the failure occurred in the first and second disc devices 3a-3c, 5a-5c itself. And when the control unit 1 receives the failure report which does not include an error indicating the failure occurred inside the first and second disc devices 3a-3c, 5a-5c, it is possible to identify the physical interconnection path where the failure occurred by the method of the first exemplary embodiment and the variation. Further, if the control unit recognizes the failure occurred in either of the first and second disc devices 3a-3c, 5a-5c, the method of the first exemplary embodiment and the variation can be used after exchanging a faulty disc device.

[Program]

A program in the first exemplary embodiment of the present invention should be a program which makes a processor carry out Steps S1-S3 shown in FIG. 5 and Steps S11-S13 shown in FIG. 8. By installing this program in a disk array device and carrying out this program, the disk array device 100 which perform the function described in the first exemplary embodiment and the failure path specifying method can be realized.

According to the first exemplary embodiment, the failure path can be specified by the control unit 1 as described above. In this exemplary embodiment, because the failure is detected to each disk device by using the same test pattern, the failure path can be specified more accurately.

According to the first exemplary embodiment, the test area 311 is provided in the data stored unit 31 of each disk devices 3a-3c, the reading and writing processing of the test pattern is performed to this test area 311, and the failure path is specified. For this reason, it is possible to determine whether or not failures occur in a physical interconnection path without adding a special circuit. And, because a special circuit is not used, the failure path can be specified by carrying out a usual reading and writing processing.

(2) Second Exemplary Embodiment

Figure 9:
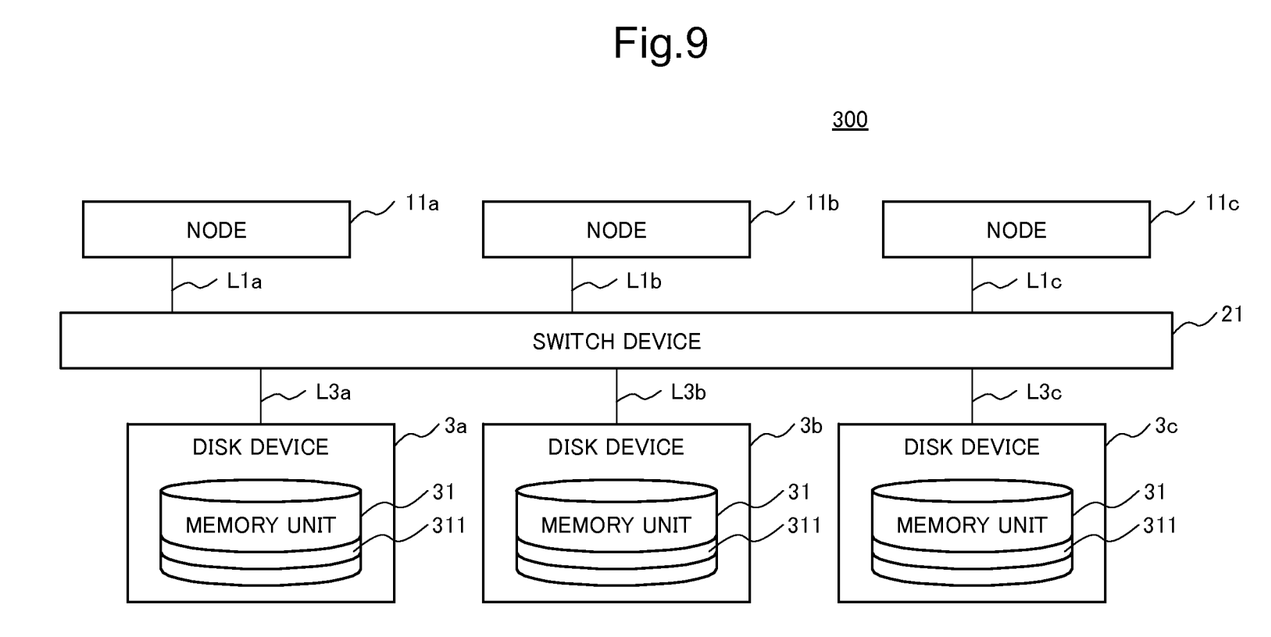
FIG. 9 is a diagram showing a configuration of a disk array device according to a second exemplary embodiment of the present invention.

Next, a disk array device according to a second exemplary embodiment of the present invention will be described with reference to a drawing. FIG. 9 is a diagram showing a configuration of a disk array device in the second exemplary embodiment of the present invention. Further, the disk array device according to the second exemplary embodiment is mainly different from the above-mentioned first exemplary embodiment in a point that disc array device 300 has a plurality of nodes 11 corresponding to the control unit 1 of the first exemplary embodiment. Therefore, the description will be omitted about the same part as the first exemplary embodiment, and it will be explained focusing a part different from the first exemplary embodiment.

As shown in FIG. 9, the disk array device according to the second exemplary embodiment is provided with a plurality of nodes 11a-11c. A server or a personal computer (PC) is an example of nodes 11a-11c.

Each of the nodes 11a-11c is connected to a plurality of disk devices 3a-3c, respectively via a switch device 21 corresponding to the switch unit 2 of the first exemplary embodiment. The node 11a is connected to the switch device 21 via a physical interconnection path L1a, and the node 11b is connected to the switch device 21 via a physical interconnection path L1b, and the node 11c is connected to the switch device 21 via a physical interconnection path L1c, in detail.

And when writing processing or reading processing of a test pattern is carried out to the disk device 3a from the node 11a and a failure occurred, the node 11a specifies a failure path by the same method as the method described in the first exemplary embodiment.

While the embodiments of this invention have been described in conjunction with the preferred embodiments described above, it will now be possible for those skilled in the art to put this invention into practice in various other manners

What is claimed is:

1. A disk array device comprising:
a plurality of first disk devices;
a plurality of second disk devices;
a control unit configured to control data access from an external devices to the first and second disk devices; and
a first switch unit configured to intervene between the control unit and each of the first disk devices via paths; and
a second switch unit configured to intervene between the first switch unit and each of the second disk devices via paths,
wherein the control unit performs a writing test in each of the first and second disk devices and determines whether or not the control unit receives a failure report of the writing test from the each of the first and second disk devices,
wherein when the control unit receives the failure report from one of the first disk devices and does not receive the failure report from each one of the other first disk devices, the control unit identifies a path between the first switch and the one of the first disk devices which sends the failure report as a failure path,
wherein when the control unit receives the failure report from the each of the first disk devices, the control unit identifies a path between the control unit and the first switch unit as the failure path,
wherein when the control unit receives the failure report from one of the second disk devices, the control unit determines whether or not the control unit receives the failure report from the plurality of the first disk devices in a first determining, and
wherein when the control unit receives the failure report from the plurality of the first disk devices in the first determining, the control unit identifies a path between the control unit and the first switch unit as the failure path.

2. The disk array device according to claim 1,
wherein when the control unit does not receive the failure report from at least one of the plurality of the first disk devices in the first determining, the control unit determines whether or not the control unit receives the failure report from the others of the second disk devices, in a second determining, and wherein when the control unit receives the failure report from the others of the second disk devices in the second determining, the control unit identifies a path between the first switch unit and the second switch unit as the failure path.

3. The disk array device according to claim 2, wherein when the control unit does not receive the failure report from at least one of the others of the second disk devices in the second determining, the control unit identifies a path between the second switch unit and the one of the second disk devices as the failure path.

4. The disk array device according to claim 3, wherein when it is not possible to write the test data in the plurality of the first disc devices, the control unit receives an error of the writing test from each of the first disc devices.

5. The disk array device according to claim 4, wherein when the control unit does not receive the error of the writing test from at least one of the plurality of the first disc devices in the first determining, the control unit determines whether or not the control unit receives the error of the writing test from the others of the second disc devices, in a second determining, and
wherein when the control unit receives the error of the writing test from the others of the second disc devices in the second determining, the control unit identifies a path between the first switch unit and the second switch unit as the failure path.

6. The disk array device according to claim 5, wherein when the control unit does not receive the error of the writing test from at least one of the others of the second disc devices in the second determining, the control unit identifies a path between the second switch unit and the one of the second disc devices as the failure path.

7. A failure path specifying method of a disc array device having a plurality of first disk devices and a plurality of second disk devices, a control unit and a first switch unit configured to intervene between the control unit and each of the first disk devices via paths, the control unit and a second switch unit configured to intervene between the first unit and each of the second disk devices via paths, the method comprising:
controlling the first disk devices and the second disk devices;
performing a writing test in each of the first disk devices and of the second disk devices;
when a first failure is received from any one of the first disk devices and of the second disk devices, determining whether or not a second failure report is received from any other first disk device and from any other second disk device;
when the second failure report is not received, identifying a path between the first switch and the one of the first disk devices as a failure path, the one of the first disk devices sending the failure report as the failure path;
when receiving the failure report from the each of the first disk devices, identifying a path between the control unit and the first switch unit as the failure path;
when receiving the failure report from one of the second disk devices, determining whether or not the control unit receives the failure report from the plurality of the first disk devices in a first determining; and
when receiving the failure report from the plurality of the first disk devices in the first determining, identifying a path between the control unit and the first switch unit as the failure path.

8. The failure path specifying method according to claim 7, further comprising:
when the second failure report is received, identifying a path between the control unit and the first switch unit.

9. The failure path specifying method according to claim 8, wherein when it is not possible to write the test data in one of the first disc devices and it is possible to write the test data in at least one of the others of the first disk devices, a path between the first switch and the one of the first disk devices is identified as the failure path, in the identifying step.

10. The failure path specifying method according to claim 9, further comprising:
receiving an error of the writing test from each of the first disc devices when it is not possible to write the test data in the plurality of the first disc devices.

11. The failure path specifying method according to claim 10, further comprising:
when the error of the writing test is not received from at least one of the plurality of the first disc devices in the first determining step, determining whether or not the error of the writing test is received from the others of the second disc devices, in a second determining step, and
wherein when the error of the writing test is received from the others of the second disc devices in the second determining step, a path between the first switch unit and the second switch unit is identified as the failure path, in the identifying step.

12. The failure path specifying method according to claim 11,
wherein when the error of the writing test is not received from at least one of the others of the second disc devices in the second determining step, a path between the second switch unit and the one of the second disc device is identified as the failure path, in the identifying step.

13. A non-transitory computer readable medium recording thereon a program for enabling a computer to carry out a failure path specifying method of a disc array device having a plurality of first disk devices and a plurality of second disk drives, a control unit and a first switch unit configured to intervene between the control unit and each of the first disk devices via paths, the control unit and a second switch unit configured to intervene between the first switch unit and each of the second disk devices via paths, the method comprising:
controlling the first disk devices and the second disk devices;
performing a writing test in each of the first disk devices and of the second disk devices;
when a first failure is received from any one of the first disk devices and of the second disk devices, determining whether or not a second failure report is received from any other first disk device or any other second disk device;
when the second failure report is not received, identifying a path between the first switch and the one of the first disk devices as a failure path, the one of the first disk devices sending the failure report as the failure path;
when receiving the failure report from the each of the first disk devices, identifying a path between the control unit and the first switch unit as the failure path;
when receiving the failure report from one of the second disk devices, determining whether or not the control unit receives the failure report from the plurality of the first disk devices in a first determining; and when receiving the failure report from the plurality of the first disk devices in the first determining, identifying a path between the control unit and the first switch unit as the failure path.

14. The non-transitory computer readable medium according to claim 13, wherein the method further comprises:
when the second failure report is received, identifying a path between the control unit and the first switch unit.

15. The non-transitory computer readable medium according to claim 14,
wherein when it is not possible to write the test data in the one of the first disc devices and it is possible to write the test data in at least one of the others of the first disk devices, a path between the first switch unit and the one of the first disk devices is identified as the failure path, in the identifying step.

16. The non-transitory computer readable medium according to claim 15, the method further comprising:
receiving an error of the writing test from each of the first disc devices when it is not possible to write the test data in the plurality of the first disc devices.

17. The non-transitory computer readable medium according to claim 16, further comprising:
when the error of the writing test is not received from at least one of the plurality of the first disc devices in the first determining step, determining whether or not the error of the writing test is received from the others of the second disc devices, in a second determining step, and
wherein when the error of the writing test is received from the others of the second disc devices in the second determining step, a path between the first switch unit and the second switch unit is identified as the failure path, in the identifying step.

18. The computer medium according to claim 17,
wherein when the error of the writing test is not received from at least one of the others of the second disc devices in the second determining step, a path between the second switch unit and the one of the second disc device is identified as the failure path, in the identifying step.

19. The disk array device according to claim 1,
wherein a plurality of nodes control the first disc devices as the control unit.

20. A disk array device comprising:
a plurality of first disk devices and a plurality of second disk devices configured to store test data;
a control unit configured to control the first disk devices and the first disk devices;
a first switch unit configured to intervene between the control unit and each of the first disk devices via paths;
a second switch unit configured to intervene between the first switch unit and each of the second disk devices via paths, and
wherein the control unit performs a reading test for determining whether or not it is possible to read the test data in each of the first disk devices and the second disk devices and identifies a failure path in the paths according to a result of the reading test, as sent by one of the first and second disk devices as a failure report,
wherein when the control unit receives the failure report from the each of the first disk devices, the control unit identifies a path between the control unit and the first switch unit as the failure path,
wherein when the control unit receives the failure report from one of the second disk devices, the control unit determines whether or not the control unit receives the failure report from the plurality of the first disk devices in a first determining, and
wherein when the control unit receives the failure report from the plurality of the first disk devices in the first determining, the control unit identifies a path between the control unit and the first switch unit as the failure path.

* * * * *